UNITED STATES PATENT OFFICE.

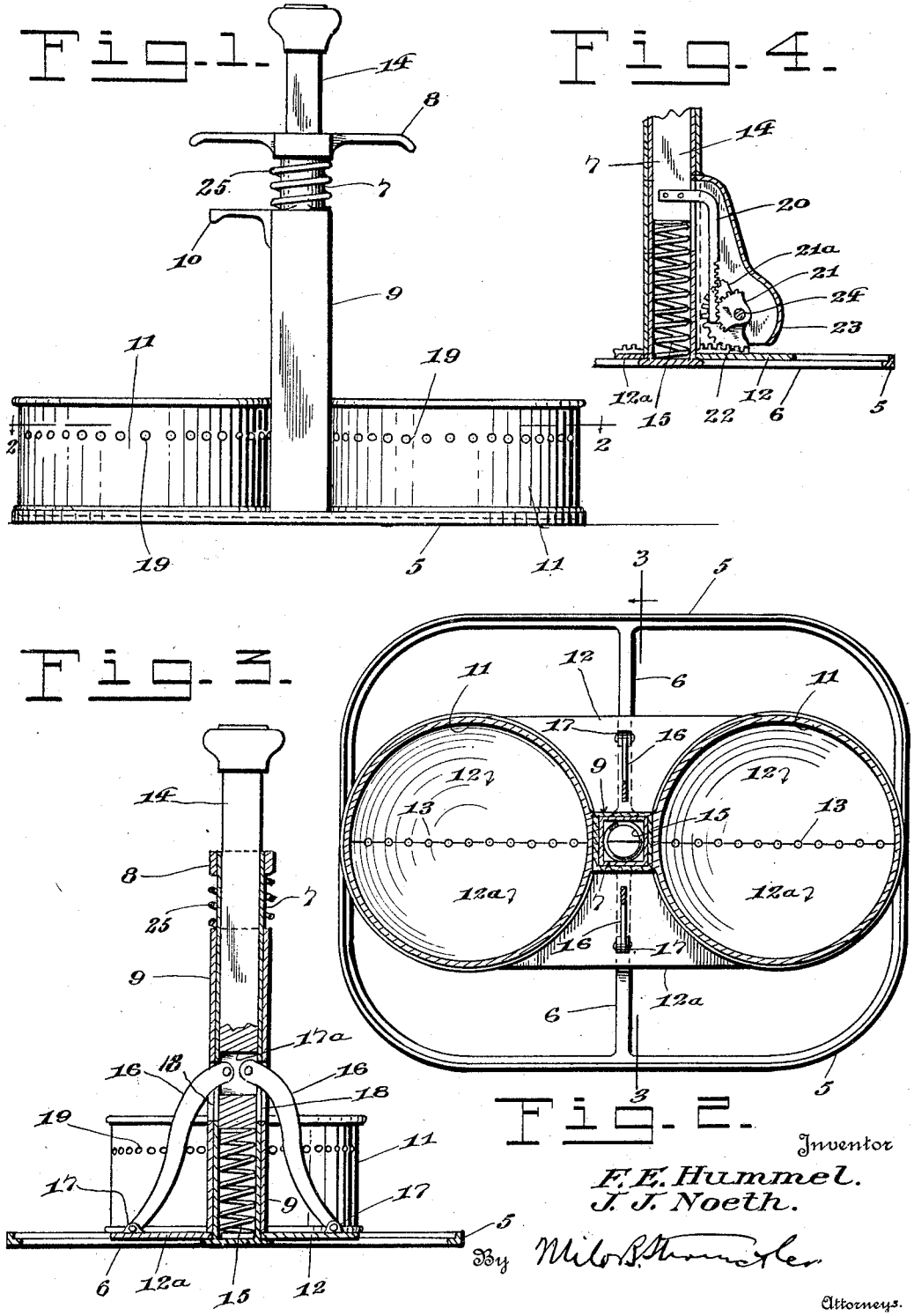

FREDERICK E. HUMMEL AND JOHN J. NOETH, OF CHICAGO, ILLINOIS.

EGG-POACHING APPARATUS.

1,399,015.	Specification of Letters Patent.	Patented Dec. 6, 1921.

Application filed December 10, 1920. Serial No. 429,747.

*To all whom it may concern:*

Be it known that we, FREDERICK E. HUMMEL and JOHN J. NOETH, citizens of the United States, residing at Chicago, in the county of Cook and State of Illinois, have invented new and useful Improvements in Egg-Poaching Apparatus, of which the following is a specification.

This invention relates to devices holding eggs while poaching the same, and its object is to provide a device of this kind which permits perfect drainage of water from the eggs when they are ready to be served, and which enables the eggs to be removed without breaking the same, and deposited in the place desired, such as in the center of a slice of toasted bread, without loss of any portion of the egg.

With the object stated in view the invention consists in a novel combination and arrangement of parts to be hereinafter described and claimed, and in order that the same may be better understood, reference is had to the accompanying drawing forming a part of this specification.

In the drawing,

Figure 1 is an elevation of the apparatus; Fig. 2 is a horizontal section on the line 2—2 of Fig. 1; Fig. 3 is a cross section on the line 3—3 of Fig. 2, and Fig. 4 is a sectional detail showing a modification.

Referring specifically to the drawing, the base of the device is of skeleton construction, the same consisting of a rim 5 and a medial cross bar 6. Midway between its ends, the cross bar 6 supports a tubular upright 7 of non-circular cross-section, fitted at its upper end with a handle 8.

Over the outside of the upright 7 is slidably mounted a sleeve 9 having a handle 10 at its upper end, and carrying at its lower end two rings 11 of suitable height to form the side walls of egg-cups. The apparatus is therefore designed for poaching two eggs simultaneously. Each egg-cup is provided with a slidable bottom consisting of two plates 12 and 12$^a$ which are slidable toward and from each other, the plates being of such length that they serve for both cups. The meeting edges of the plates 12 and 12$^a$ are recessed, as shown at 13, and when said edges come together, these recesses match and produce drainage outlet apertures. The plates 12 and 12$^a$ are supported by the rim 5 and the cross-bar 6, and they are designed to be separated for the discharge of the cup contents, the following means being provided for operating the plates for this purpose:

In the upright 7 is slidably seated a plunger 14 backed by a spring 15 tending to slide the plunger upwardly. The plunger 14 is connected by side links 16 to the plates 12 and 12$^a$, said links being pivoted at their lower ends to ears 17 on said plates, and pivotally connected at their upper ends in a recess 17$^a$ in the plunger. The upright 7 and the sleeve 9 are slotted as shown at 18, and the links 16 pass through said slots. The plates 12 and 12$^a$ are normally held drawn together by the spring 15 through the plunger 14 and the links 16.

In use, as the apparatus, with its contents ready to serve, is lifted out of the boiler by grasping the handle 8 with one hand, the other hand is applied to handle 10 to elevate the cup sides 11 slightly above the plates 12 and 12$^a$ to allow the water to drain out. The handle 10 is then released to reseat the cup sides 11, and the apparatus may be carried to the waiting toast. Here, the hand removed from the handle 10 is applied to the upper end of the plunger 14 projecting from the upright 7, to push the plunger down and thus effect the spreading of the plates 12 and 12$^a$, whereupon each poached egg drops straight down onto its slice of toast.

The side walls 11 of the cups have perforations 19 just above the approximate height of the egg, to assist the water to drain from above the egg before the side walls are lifted as hereinbefore described.

Fig. 4 shows a different means for operating the plates 12 and 12$^a$. Here, the plunger carries a rack bar 20 which is in mesh with a sector gear 21, which latter operates a second sector gear 21$^a$ which is in mesh with a rack 22 on the plate, this gearing being provided for each plate. The upright 7 has a hood 23 inclosing the gearing and supporting the shaft 24 of the sector gears 21 and 21$^a$.

Around the upper end of the upright 7, between the handle 8 and the top of the sleeve 9, is placed a coiled spring 25 to reseat the cup side walls 11 when they are released.

We claim:

1. An egg poaching apparatus comprising a base, a tubular upright rising from the base, a sleeve slidably mounted on the upright, an egg cup side wall carried by the sleeve, a bottom for the egg cup composed of a pair of plates mounted on the aforesaid base, said plates being slidable to come together at their opposite edges, and also to spread, a spring-pressed plunger in the upright and projecting therefrom, and connections between the plunger and the plates for moving the latter in opposite directions.

2. An egg-poaching apparatus comprising an egg cup composed of a side wall, and a bottom separate from said side wall and composed of a pair of plates which are slidable transversely beneath the side wall to come together at their opposite edges, and also to spread, a support for said plates, and a slidable support for the side wall carried by said support for permitting said wall to be elevated relative to the plates.

3. An egg-poaching apparatus comprising an egg cup composed of a side wall, and a bottom separate from said side wall and composed of a pair of plates which are slidable transversely beneath the side wall to come together at their opposite edges, and also to spread, said edges having notches which match to form drain openings, a support for said plates, and a slidable support for the side wall carried by said support for permitting said wall to be elevated relative to the plates.

4. An egg-poaching apparatus comprising an egg cup composed of a side wall having perforations to form drain openings, and a bottom separate from said wall and composed of a pair of plates which are slidable transversely beneath the side wall to come together at their opposite edges, and also to spread, a support for said plates, and a slidable support for the side wall carried by said support for permitting said wall to be elevated relative to the plates.

5. An egg-poaching apparatus comprising a base having an opening, an egg cup composed of a side wall, and a bottom separate from said wall and composed of a pair of plates mounted on the base over the opening therein, and slidable transversely beneath the side wall to come together at their opposite edges, and also to spread, and a slidable support for the side wall carried by the base for permitting said wall to be elevated relative to the plates.

In testimony whereof we affix our signatures.

FREDERICK E. HUMMEL.
JOHN J. NOETH.